Patented Dec. 24, 1935

2,025,546

UNITED STATES PATENT OFFICE 2,025,546

VAT DYESTUFFS OF THE ANTHRAQUINONE SERIES AND PROCESS OF PRODUCING SAME

Paul Nawiasky, Ludwigshafen-on-the-Rhine, and Berthold Stein, Mannheim, Germany, assignors to General Aniline Works, Inc., New York, N. Y., a corporation of Delaware No Drawing. Application December 23, 1932, Serial No. 648,726. In Germany December 30, 1931

10 Claims. (Cl. 260—53)

The present invention relates to vat dyestuffs of the anthraquinone series of excellent fastness properties and process of producing same.

For the preparation of coerthionium compounds of the anthraquinone series, it has already been proposed to treat dianthraquinonyl sulphides with condensing agents, as for example sulphuric acid; thus by heating 1,2'-dianthraquinonyl sulphide in sulphuric acid of 66° Bé. strength, a coerthionium compound is obtained which dyes cotton yellowish green shades from a brown hydrosulphite vat.

We have now found that more valuable vat dyestuffs are obtained by heating compounds corresponding to the general formula

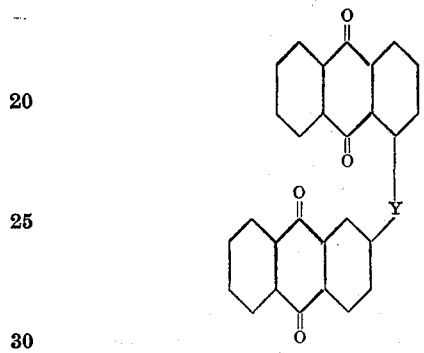

which may be substituted for example by halogen, alkyl or a carboxylic, cyano or alkoxyl group, and in which Y stands for —S— or

with zinc chloride, preferably to temperatures above 200° C. For example the reaction may be carried out by melting the initial material with anhydrous zinc chloride at about 300° C.

When employing 1,2'-dianthraquinonyl sulphide itself, a vat dyestuff which dyes cotton strong bluish green shades from a green vat is obtained as well as a vat dyestuff which dyes cotton maroon shades from an olive brown vat. The first-mentioned dyestuff is distinguished by excellent fastness properties, especially by a very good fastness to light. Elementary analysis indicates that it is probable that the dyestuff has the following structure

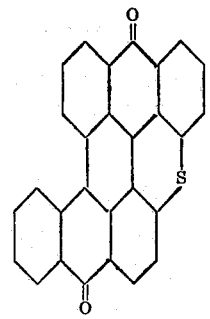

Similar dyestuffs are formed when employing instead of 1,2'-dianthraquinonyl sulphide its substitution products, as for example alkyl, carboxy, cyano, halogen, alkoxy and like derivatives. When halogen derivatives of 1.2'-dianthraquinonyl sulphide are treated with zinc chloride a more or less fargoing elimination of halogen may occur.

Dyestuffs of the same kind are also formed when starting with oxidation products of 1,2'-dianthraquinonyl sulphide and derivatives of the character of sulphoxides which are readily obtainable from the sulphides, for example by oxidation with ammonium persulphate or nitric acid.

The formation of the dyestuffs is frequently promoted by the presence of suitable catalysts, such as cuprous chloride, copper chloride and the like. The dyestuffs usually yield dyeings of green shade which in all cases have very good fastness properties; especially their fastness to light is excellent. The dyeings and printings obtained with the dyestuffs yield valuable white discharge effects.

The crude dyestuffs may be purified by treatment with alkaline solutions of dextrose or by recrystallization or by dissolving them in sulphuric acid and subsequent fractional precipitation.

The following examples will further illustrate how the said invention may be carried out in practice but the invention is not restricted to these examples. The parts are by weight.

Example 1

5 parts of 1,2'-dianthraquinonyl sulphide and 0.3 part of copper chloride are introduced at 300° C. into 100 parts of anhydrous zinc chloride. The melt is stirred for about an hour at from 305° to 310° C. and then poured while still hot into 2000 parts of hot water to which a little hydrochloric acid has been added. The separated reaction product is treated after drying, with an organic solvent, such as mono-chlorbenzene. The solution then contains a dyestuff which dyes cotton green shades and the residue is a dyestuff which dyes cotton maroon shades and which dissolves in 96 per cent sulphuric acid giving a dark brownish red solution. The green dyestuff may be purified by dissolving it in 96 per cent sulphuric acid and precipitating it fractionally at 60° C. by means of 62 per cent sulphuric acid. The purified green dyestuff dissolves in concentrated sulphuric acid giving a yellow red coloration and dyes cotton strongly bluish green shades from a green vat.

The same dyestuff is obtained from 8- or 5-chlor-1,2'-dianthraquinonyl sulphide or 1,2'-dianthraquinonyl sulphoxide by the treatment described in the first paragraph of this example.

Example 2

10 parts of 6-chlor-1,2'-dianthraquinonyl sulphide (obtainable for example by condensing 1-brom-6-chloranthraquinone with 2-mercaptoanthraquinone) and 0.5 part of cupric chloride are added to 200 parts of anhydrous zinc chloride at 300° C. A temperature of between 300° and 305° C. is maintained while withdrawing samples from time to time. As soon as in the samples worked up no further increase in dyestuff formed can be observed, the melt is allowed to cool and heated to boiling with diluted hydrochloric acid in order to remove the inorganic materials. The product is then warmed with an aqueous alkaline solution of dextrose, whereby undesired by-products are dissolved while the dyestuff remains undissolved. The latter is filtered off by suction, washed with alkaline solution of dextrose and then with water. The dyestuff thus obtained is a green powder which may be further purified by recrystallization from organic solvents, such as nitrobenzene or by dissolution in sulphuric acid and fractional precipitation. The dyestuff which corresponds probably to the formula

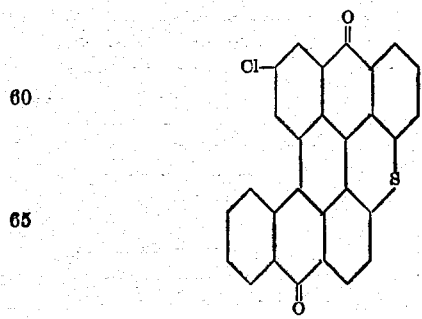

dyes cotton green shades from a green vat.

A dyestuff having similar properties is obtained by starting with 7-chlor-1,2'-dianthraquinonyl sulphide.

What we claim is:—

1. Vat dyestuffs corresponding to the general formula

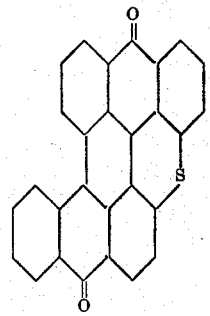

which may be substituted by a halogen, an alkyl, carboxylic, cyano or alkoxyl group, the said dyestuffs dyeing cotton usually green shades of excellent fastness properties, especially of high fastness to light.

2. A vat dyestuff corresponding to the formula

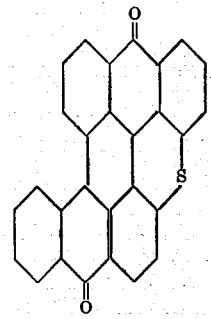

dyeing cotton bluish green shades of excellent fastness properties, especially of high fastness to light, from a green vat.

3. Vat dyestuffs corresponding to the formula

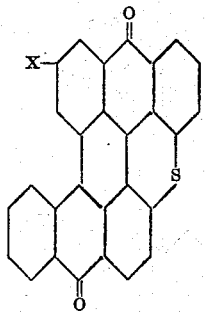

in which X stands for a halogen, the said dyestuffs dyeing cotton green shades of excellent fastness properties, especially of high fastness to light.

4. A vat dyestuff corresponding to the formula

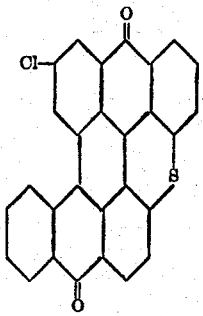

dyeing cotton green shades of excellent fastness properties, especially of high fastness to light, from a green vat.

5. The process of producing vat dyestuffs of excellent fastness properties which comprises heating a compound corresponding to the general formula

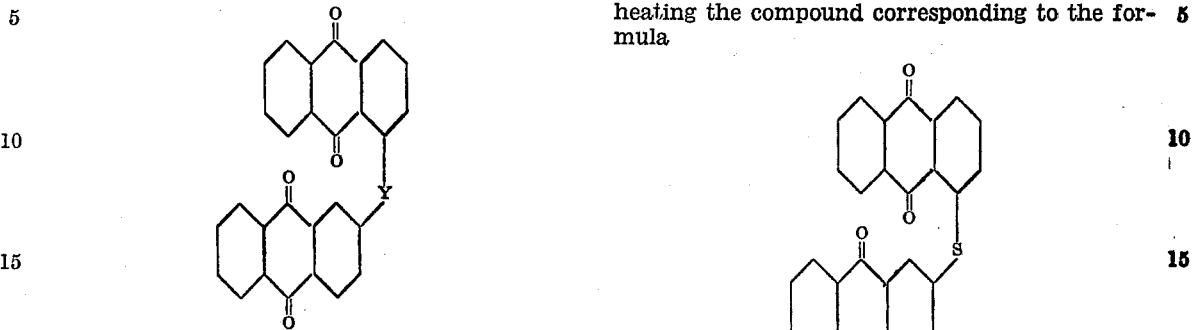

which may be substituted by halogen, an alkyl, carboxylic, cyano or alkoxyl group, and in which Y stands for —S— or $$-\underset{\underset{O}{\|}}{S}-,$$

with zinc chloride.

6. The process of producing vat dyestuffs of excellent fastness properties which comprises heating compounds corresponding to the general formula which may be substituted by halogen, an alkyl, carboxylic, cyano or alkoxyl group and in which Y stands for —S— or $$-\underset{\underset{O}{\|}}{S}-,$$

with zinc chloride at temperatures between 200° and 310° C.

7. The process of producing a vat dyestuffs of excellent fastness properties which comprises heating the compound corresponding to the formula with zinc chloride at temperatures between 200° and 310° C.

8. The process of producing a vat dyestuff of excellent fastness properties which comprises heating the compound corresponding to the formula with zinc chloride at temperatures between 300° and 310° C.

9. The process of producing a vat dyestuff of excellent fastness properties which comprises heating the compound corresponding to the formula with zinc chloride at temperatures between 200° and 310° C.

10. The process of producing a vat dyestuff of excellent fastness properties which comprises heating the compound corresponding to the formula with zinc chloride at temperatures between 300° and 310° C.

PAUL NAWIASKY.
BERTHOLD STEIN.